Dec. 9, 1958 R. S. ROOT 2,863,537
HEAVY DUTY FRICTION CLUTCH
Filed March 4, 1957 3 Sheets-Sheet 2
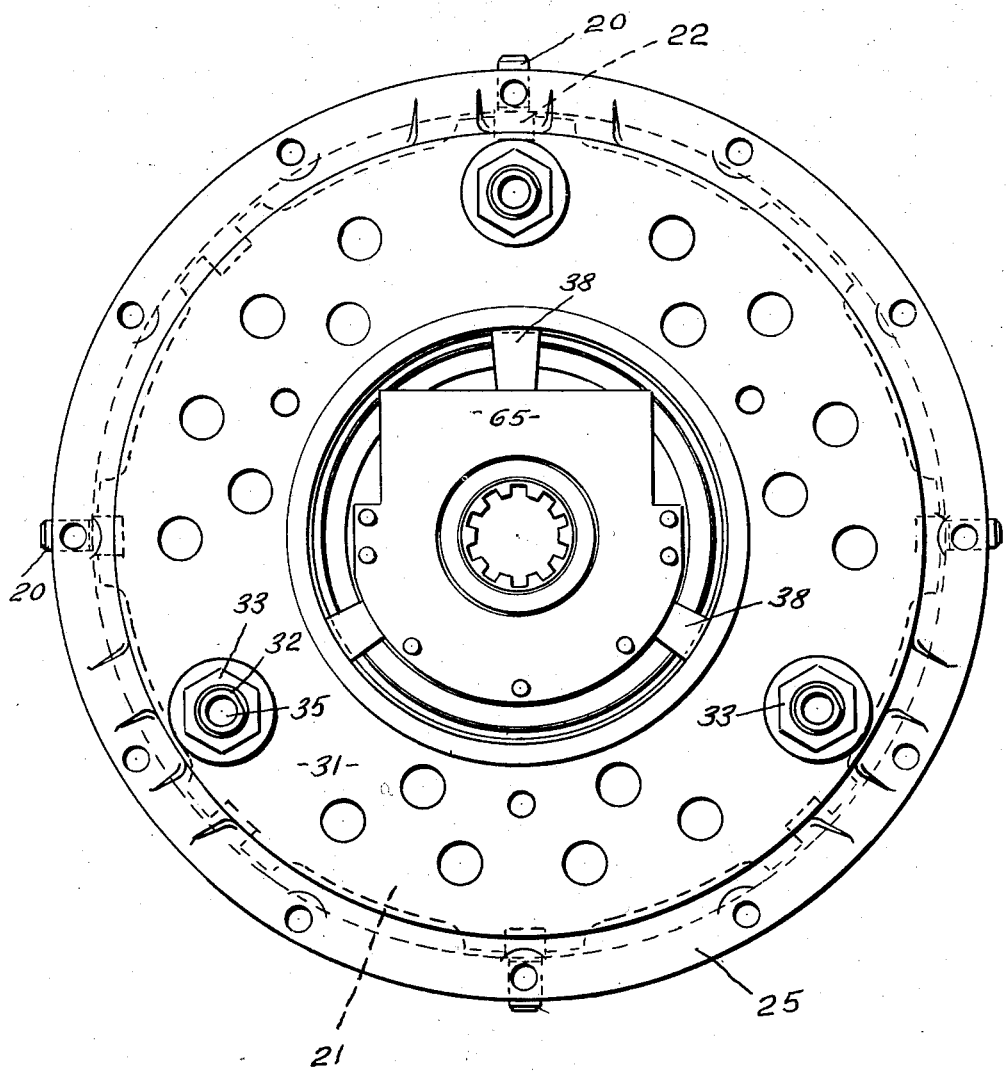
Fig-2-
INVENTOR.
Robert S. Root
BY
D. Emmett Thompson
ATTORNEY.

Dec. 9, 1958 R. S. ROOT 2,863,537
HEAVY DUTY FRICTION CLUTCH
Filed March 4, 1957 3 Sheets-Sheet 3
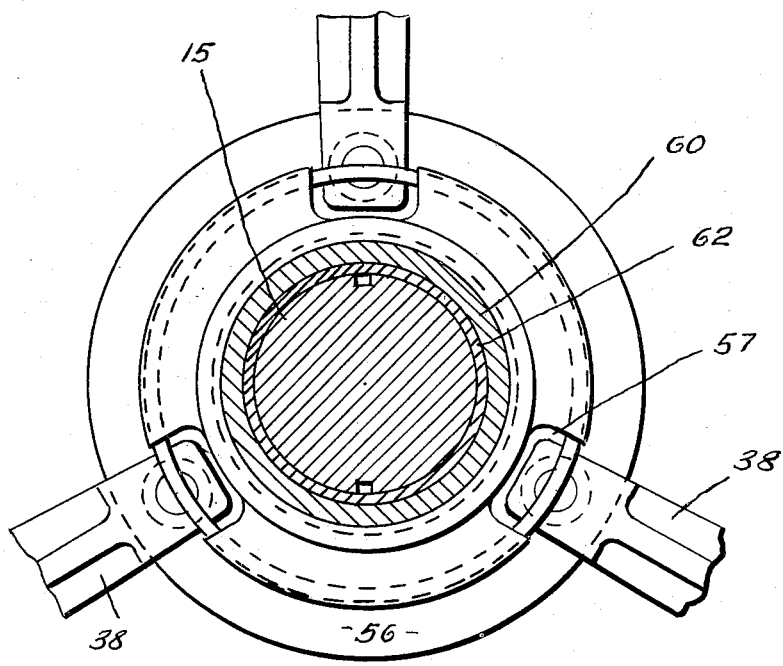
Fig-3-
INVENTOR.
Robert S. Root
BY
*L. Emmett Thompson*
ATTORNEY.

2,863,537

HEAVY DUTY FRICTION CLUTCH

Robert S. Root, Westvale, N. Y., assignor to Lipe-Rollway Corporation, Syracuse, N. Y., a corporation of New York Application March 4, 1957, Serial No. 643,664

4 Claims. (Cl. 192—13)

This invention relates to heavy duty friction clutches of the type used in large automotive vehicles, such as trucks, land graders, and the like, and has as an object the provision of a braking means on the clutch which may be adjusted from time to time to compensate for wear in the clutch.

More specifically, it is an object of this invention to provide a heavy duty clutch wherein the clutch portion is non-adjustable and the brake portion is adjustable.

The invention consists in the novel features and in the combinations and constructions hereinafter set forth and claimed.

In describing this invention, reference is had to the accompanying drawings in which like characters designate corresponding parts in all the views.

Figure 2 is a view looking in the direction of line 2—2 of Figure 1.

Figure 3 is a cross section taken on line 3—3 of Figure 1.

Figure 1:
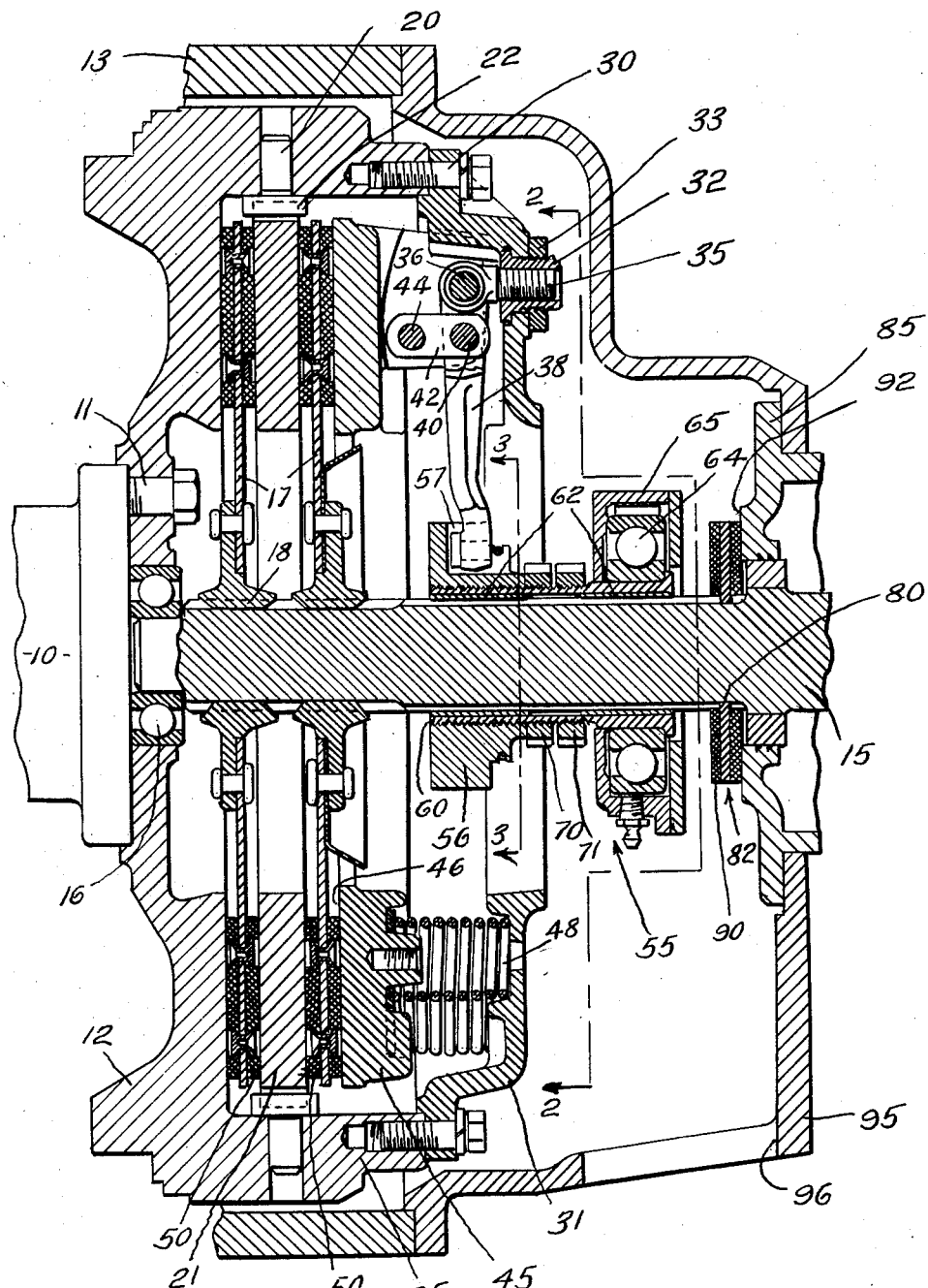
Figure 1 is a cross sectional view of the invention.

The number 10 indicates a drive shaft which is connected, as at 11, to a driving member 12 which may be a fly wheel, or the like. The fly wheel and driving shaft are surrounded and enclosed by a housing 13. The driving member 12 has the driven shaft 15 journalled in the bearings 16 centrally of the driving member 12. The driven shaft has a pair of friction disks 17 keyed thereto, as at 18, so as to allow the disks to move axially on the shaft. The driving member 12 carries a plurality of pins 20 which are received at their inner ends in slots 22 in a driving plate 21, so as to allow the driving plate to move laterally by means of the slots 22 on the pins 20. Affixed to an annular flange 25 of the driving member, as by fasteners 30, is a fulcrum plate 31. The fulcrum plate has a plurality of circumferentially spaced sleeves 32 mounted in the plate by means of nuts 33. Received in the sleeves 32 is a pivot pin 35 which is pivotally connected, as at 36, to a plurality of throw-out levers 38. Intermediate the pivotal connection 36 and the inner end of the throw-out lever 38 is a pivotal connection 40 to a connector bar 42. The connector bar 42 is pivotally connected, as at 44, at its inner end to a pressure plate 45. The pressure plate has an inner face 46 which engages the outer face of one of the friction disks 17. The pressure plate is normally biased into engagement with the outer fricion disk by a plurality of compression springs 48 circumferentially spaced about the periphery of the pressure plate. These springs normally act to force the pressure plate into engagement with the outer friction disk 17 which carries friction faces 50 on both of its surfaces. The inner surface of the outer friction plate, in turn, engages the driving plate 21 which engages the outer friction surface 50 on the inner friction disk which, in turn, engages the driving surface on the fly wheel, all whereby a frictional driving engagement is normally effected between the driving member and the driven shaft by means of the friction disks, pressure plate, and driving plate.

The inner ends of the levers 38 are received in a throw-out unit, generally indicated at 55, mounted for axial movement on the driven shaft 15. The throw-out unit 55 consists of a throw-out collar 56 having a plurality of circumferentially spaced pockets 57 which receive the inner end of the levers 38. The throw-out collar 56 is threaded on the sleeve 60 and the sleeve is mounted on a pair of bushings 62 which, in turn, are mounted on the splined driven shaft 15. Bearing 64 is mounted at the opposite end of the sleeve 60, and carries a throw-out member 65 which is connected through suitable linkage (not shown) to the clutch pedal of the vehicle. Mounted on the sleeve 60, intermediate the throw-out collar 56 and the yoke member 65 and normally jammed into engagement with the throw-out collar 56, are a pair of adjusting nuts 70 and 71, for a purpose hereinafter described. Keyed to the outer end of the driven shaft 15, as at 80, is an inertia brake 82 which is free to move axially on the shaft between the yoke member 65 and a fixed housing 85. By reason of the fact that the inertia brake 82 is keyed to the driven shaft, it will be seen that the intertia brake must rotate with the driven shaft.

When the yoke member 65 is caused to move axially rearwardly toward the housing 85 by means of the clutch pedal linkage, the levers 38, carried in the pockets 57 of the throw-out collar through their pivotal connection to the pressure plate 25, will cause the driving connection between the driving member 12 and the driven shaft through the friction disks 17 to be disengaged. In order that the operator of the vehicle may quickly and easily shift the vehicle into another gear, it is necessary that the inertia in the driven member be braked. This is effected by the movement of the yoke member 65 axially toward the inertia brake 82. This movement causes the member 65 to engage the outer friction face 90 of the inertia brake, moving it rearwardly into engagement with the face 92 of the fixed housing 85. Since the inertia brake is fixed to the driven shaft, this will cause a braking of the driven shaft 15, thus enabling the vehicle operator to quickly shift the gears in the vehicle.

It will be seen that the compression springs 48, acting through the pressure plate 25, normally effect a driving engagement between the driving member 12 and the driven shaft 15 by means of the friction disks, the driving plate and the pressure plate. Over periods of long continued use, this will cause wear to take place on the friction material 50 carried by the friction disks 17. The compression springs automatically compensate for this wear since they normally urge the pressure plate to move axially along the driven shaft, forcing the friction disks into engagement with the driving plate and the driving member. This wear on the friction material 50 is accentuated through the levers 38, so that a small axial movement of the friction disks toward the driving member causes a pronounced movement of the yoke member 65 away from the inertia brake 82. This is undesirable since the distance between the yoke bearing and the inertia brake should be kept as nearly uniform as possible in order that the fly wheel inertia may be braked quickly when the vehicle is in operation to shift gears and in order that the vehicle operator may have a more exact control over the vehicle. To compensate for this axial movement of the yoke member 65 from the inertia brake, the nuts 70 and 71 merely need to be jammed together on the sleeve 60 intermediate the throw-out collar 56 and the yoke member 65. After jamming the nuts 70 and 71 together in spaced relation to the throw-out collar 56 the nuts 70 and 71 act as a single fixed unit for the reception of a wrench or the like to effect rotation of the sleeve, and to move it axially rearwardly relative to the throw-out collar, thus effecting a movement of the yoke member 65 outwardly and allowing the distance between the yoke member 65 and the inertia brake 82 to be adjusted. The housing 95, which encloses the clutch, is provided with an access opening 96 to allow such jamming and rotation of the nuts and consequent adjustment of the brake.

It will thus be seen that by my invention I have provided a heavy duty vehicle clutch wherein the clutch portion of the mechanism is automatically adjusted due to wear and the brake portion may be adjusted as desired when necessary.

What I claim is:

1. A friction clutch for connecting driving and driven shafts having means for normally effecting a driving connection between said shafts and clutch throw-out means for disengaging said driving connection, means for moving said clutch throw-out means including a clutch throw-out unit mounted for movement axially of said driven shaft, said unit comprising a sleeve threaded at one end, a throw-out collar on said one end and engageable with said clutch throw-out means to effect movement thereof upon axial movement of said unit, a yoke member axially fixed on the other end of said sleeve, inertia brake means operative between a fixed member and a driven member and engaged by movement of said throw-out unit to disengage said clutch driving connection, and means mounted on said sleeve for moving said sleeve axially relative to said throw-out collar, whereby as the clutch driving connection wears and the normal position of said throw-out unit is shifted axially, said unit may be adjusted to ensure full engagement of said inertia brake means.

2. A friction clutch for connecting driving and driven shafts having means for normally effecting a driving connection between said shafts and clutch throw-out means for disengaging said driving connection, means for moving said clutch throw-out means including a clutch throw-out unit mounted for movement axially of said driven shaft, said unit comprising a sleeve threaded at one end, a throw-out collar on said one end and engageable with said clutch throw-out means to effect movement thereof upon axial movement of said unit, a yoke member axially fixed on the other end of said sleeve, inertia brake means axially and nonrotatably movable on the driven shaft, a fixed housing on one side of said brake means, said yoke member on the other side thereof and engageable therewith to urge said brake means against said fixed housing upon movement of said throw-out unit to disengage said clutch driving connection, and means mounted on said sleeve for moving said sleeve axially relative to said throw-out collar, whereby as the clutch driving connection wears and the normal position of said throw-out unit is shifted axially, said unit may be adjusted to ensure full engagement of said inertia brake means.

3. The friction clutch of claim 2, said means for moving said sleeve axially comprising a pair of nuts threaded on said sleeve normally locking said collar on said sleeve whereby when said nuts are moved axially away from said collar and jammed together, said sleeve and yoke member will move axially relative to said collar by rotating said jammed nuts.

4. The friction clutch of claim 1, said means for moving said sleeve axially comprising a pair of nuts threaded on said sleeve normally locking said collar on said sleeve whereby when said nuts are moved axially away from said collar and jammed together, said sleeve and yoke member will move axially relative to said collar by rotating said jammed nuts.

References Cited in the file of this patent

UNITED STATES PATENTS

| | | |
|---|---|---|
| 1,686,352 | Sweet | Oct. 2, 1928 |
| 1,879,569 | Snow | Sept. 27, 1932 |
| 2,266,581 | Baker et al. | Dec. 16, 1941 |
| 2,722,301 | Francois | Nov. 1, 1955 |